UNITED STATES PATENT OFFICE.

EMIL WÖRNER, OF BERLIN, GERMANY.

PROCESS FOR THE MANUFACTURE OF EASILY-EMULSIFIABLE FATTY MATTER.

No. 864,219.  Specification of Letters Patent.  Patented Aug. 27, 1907.

Application filed August 12, 1905. Serial No. 273,978.

*To all whom it may concern:*

Be it known that I, EMIL WÖRNER, a subject of the German Emperor, residing at Berlin, Germany, have invented a certain new and useful Process for the Manufacture of Easily-Emulsifiable Fatty Matter, of which the following is a specification.

If yolks of eggs, brain matter, nerve matter, or similar products of the animal organism, which contain phosphorus in chemical combination with organic compounds, are subjected to extraction with organic solvents, such as alcohol, ether, chloroform, petroleum spirit or mixtures of such solvents, extracts are obtained, which are rich in substances containing phosphorus, such as lecithin, protagon, and also in cerebrin and cerebron. If these extracts are mixed with iodin, bromin, or mixtures of halogens, the halogen will readily enter into chemical combination, and will be absorbed much more easily, than it would be by unsaturated fatty acids or fats containing the same. The extracts thus obtained and charged with halogen are heated with fat or fatty oil, until the remainder of the solvent used has been expelled, and the fatty matter resulting from this treatment is eminently adapted for forming emulsions with water.

The details of procedure may be as follows:—300 grams of yolks of eggs (or brain or nerve-matter, etc.) are extracted with chloroform up to complete exhaustion, the chloroform is distilled off, so as to leave only about a liter, and the remaining chloroformic solution is mixed with 2.5 grams of iodin and 0.2 grams of bromin. After the product has been allowed to stand for some time, it is mixed with 10 kilograms of arachis oil and heated while stirring, until the whole of the chloroform has been expelled. The oil is then allowed to cool, filtered and thereby made ready for use. If the oil or fatty matter thus obtained is shaken with an equal volume of water, a mixture is produced which contains the oil in a very fine state of division and is no longer liable to dissociation, that is to say, any matter, that separates out from the mixture is no longer pure fat, but an intimate cream-like mixture of fat with water, which insures an excellent absorption of the fat and of any medicaments incorporated with the same, by the animal organism.

An emulsion made from pure arachis oil and water is liable to separate into two layers, viz: a layer of pure oil and a layer of turbid water.

That the high capacity for emulsification has a favorable effect on the absorption by the animal organism, has been proved by experiments with dogs extending over a long period. In these experiments from 98.5 to 98.8 per cent of the fat taken by dogs as food was absorbed, and the utilization of the fat was therefore almost complete. The fatty matter obtained as described is therefore suitable for internal use, as a substitute for cod-liver oil, and also for external or subcutaneous use, as a vehicle for medicaments The great capacity for emulsification is also advantageous for industrial applications, for instance, if the fatty matter is intended as a lubricant for boring tools and other machinery.

What I claim is:—

1. The process for the production of easily emulsifiable fatty matter, which consists in subjecting yolks of eggs to extraction with chloroform and expelling a portion of the solvent, then mixing the extract with bromin and iodin, then mixing it with fatty oil and expelling the chloroform, substantially as described.

2. The process for the production of easily emulsifiable fatty matter, which consists in subjecting yolks of eggs to extraction with chloroform and expelling a portion of the solvent, then mixing the extract with bromin and iodin and subsequently with arachis oil, and finally expelling the chloroform by heat, substantially as described.

In testimony whereof I have hereunto set my hand in presence of two subscribing witnesses.

EMIL WÖRNER.

Witnesses:
 F. DIETZE,
 E. WINZHEIMER.